United States Patent [19]

Mortvedt et al.

[11] Patent Number: 5,221,313
[45] Date of Patent: Jun. 22, 1993

[54] MICRONUTRIENT DELIVERY SYSTEMS USING HYDROPHILIC POLYACRYLAMIDES

[75] Inventors: John J. Mortvedt, Florence, Ala.; Robert L. Mikkelsen, Carey, N.C.

[73] Assignee: Tennessee Valley Authority, Muscle Shoals, Ala.

[21] Appl. No.: 762,126

[22] Filed: Sep. 19, 1991

[51] Int. Cl.$^5$ .................... C05D 9/02; C05C 5/00; C05G 3/04
[52] U.S. Cl. ........................ 71/63; 71/58; 71/DIG. 1; 71/64.09; 71/27
[58] Field of Search ................ 71/77, DIG. 1, 58, 63

[56] References Cited

U.S. PATENT DOCUMENTS 4,396,412  8/1983  Heller et al. ................... 71/113
4,583,320  4/1986  Redenbaugh ..................... 47/58

Primary Examiner—Allen J. Robinson
Assistant Examiner—S. Mark Clardy
Attorney, Agent, or Firm—Robert A. Petrusek

[57] ABSTRACT

Inclusion of certain hydrophilic organic gel-forming polymers, notably polyacrylamides, with relatively inexpensive soluble iron sulfate [$FeSO_4$ or $Fe_2(SO_4)_3$] significantly improves the efficiency of iron source fertilizer materials for iron-sensitive plants growing on iron-deficient soils and can maintain supply of available iron to growing plants for periods up to about 12 weeks. These polymers may be mixed with iron-containing solutions to form suitable gels which are band applied in or near the seed row at or prior to planting or spot placed in the root zone of growing plants in soil. Other soluble fertilizers of micronutrients such as copper, manganese, or zinc also may be included instead of, or with, iron sulfates in hydrogels of these polymers. Hydrogels provide a unique environment which restricts contact of soluble iron fertilizers with the soil, thereby minimizing the extent of chemical reactions with the soil that reduce the availability of the applied micronutrients to plant roots. Root penetration also is greater in hydrogels than in the soil matrix so root density is greater in the banded or spot-placed gel, resulting in greater uptake efficiency of applied micronutrient.

20 Claims, No Drawings

MICRONUTRIENT DELIVERY SYSTEMS USING HYDROPHILIC POLYACRYLAMIDES

The invention herein described may be manufactured and used by or for the Government for governmental purposes without the payment to us of any royalty therefore.

Chlorosis of plants, which is attributed to iron deficiency, has been widely reported in the open literature for well over a century, yet presently there is no effective, economical method including direct soil application to correct such iron deficiencies in plants. Chlorosis is characterized by a yellowing of plant leaves due to substantially diminished amounts of chlorophyll, the formation of which chlorophyll requires adequate quantities of the micronutrient iron. Theoretically, such conditions could be quickly corrected by application of, either directly to the plant or indirectly to the soil at the plant situs, iron sources which are in a form readily available to such plant. Until the present time, however, numerous problems have been found to exist with many iron-containing compounds which tend to prevent their general use for successfully treating such iron deficiencies in plants. Examples of such problems encountered comprise the cost of the materials, the need and expense for multiple applications, and the lack of plant response under various soil conditions wherein iron chlorosis occurs.

The materials most commonly utilized to date for effecting treatment, albeit, not totally successful, or iron deficiencies have been ferrous and ferric sulfates and certain organic iron-containing compounds known as synthetic chelates or natural organic complexes. (John Mortvedt, Iron Sources and Management Practices for Correcting Iron Chlorosis Problems, *Journal of Plant Nutrition* 9:961-974, 1986). While the inorganic ferrous and ferric sulfates are relatively inexpensive, plant response to them has been found to be generally inadequate if they are applied directly to calcareous soils, wherein most such iron deficiencies occur. For instance, it has been long known that subsequent to soil application, iron sulfates quickly react to form compounds such as, for example, ferric hydroxides, the iron values of which are unavailable to plants. While some other sources of iron, generally characterized as chelates, do not react with soil to form unavailable compounds, they are so expensive that their use is restricted to application on high-value crops or for other specialized situations.

Until the present time, the most economical method used to correct iron chlorosis has been multiple and timely foliar applications of ferrous sulfate ($FeSO_4$) to the growing plants. This has been practical only on moderately iron-deficient soils. Economically justifiable results with such periodic foliar application have been poor or are frequently not obtained on soils which are characterized as being very low in available iron. In addition, the timing of foliar spray applications has been found to be quite critical in order to obtain satisfactory correction of the chlorosis condition. It has also been observed by researchers and reported in the literature that the leaves of sprayed plants may be damaged by some foliar sprays containing certain compounds or by sprays containing relatively high salt concentrations of other compounds. In addition, it has been reported that such foliar application, unless continued periodically over a substantial period of time may not be particularly effective since new growth appearing after initial spraying may again be chlorotic. Accordingly, it may reasonably be concluded that foliar spray applications are not always a satisfactory and/or economical method for correcting iron deficiencies in plants.

It has now been found that many of the above shortcomings for treating chlorosis can be overcome by practice of the present invention, wherein has been devised a new delivery system for soil situs placement of relatively inexpensive iron sulfates; said delivery system characterized by its ability to effectively isolate, for substantial periods of time, the iron sulfates contained and delivered therein from the deleterious effects of various soil constituents which normally give rise to rendering such iron sulfates unavailable to growing plants. In addition, it has also been discovered that the instant new delivery system is also highly effective for use with other micronutrients, albeit, they may not require such a high degree of isolation, wherein the instant delivery system in effect focuses uptake of such micronutrients by the plants targeted thereby. Accordingly, the instant invention is presented in a principal embodiment directed to overcoming the chlorosis problem and an alternative embodiment directed to delivery and focus for more effective uptake, the plethora of micronutrient elements known to be required by growing plants.

BACKGROUND OF THE INVENTION

1. Field of the Invention

The present invention relates to the development of relatively inexpensive materials and means to apply them which are eminently suitable for the correction of iron deficiency-induced chlorosis in plants. More particularly, the present invention relates to the development of certain combinations of gel-forming hydrophilic polymers and of iron-containing fertilizer or fertilizer amendment materials (FAM) having characteristics which significantly increase their efficiency to correct iron deficiency-induced chlorosis in plants. Still more particularly, the instant invention relates to the discovery of certain aqueous gels adapted to encapsulate, isolate, or otherwise contain selected iron compounds to provide an economical and readily available iron source imminently suitable for correcting iron deficiencies in plant life growing at such situs. Even still more particularly, the instant invention relates to the discovery that such combinations of polymers and iron-containing fertilizer or iron source FAMs should be band applied at or prior to planting or spot placed in the root zone of growing plants in soil to minimize the contact of these products with the soil so that chemical reactions which adversely affect the availability of these products to plants are minimized.

2. Description of the Prior Art

A. First Embodiment—Consideration of Chlorosis. Iron is an essential element in plant nutrition and generally is classified as a micronutrient. It is known to be involved in the synthesis of chlorophyll which in turn is required for photosynthesis in plants. A deficiency of this micronutrient in growing plants, which can be greatly exaggerated in calcareous type soils, is oftentimes the cause of chlorosis, which is characterized by a yellowing of plant leaves and stems and which results in particularly poor growth.

Currently available practices for alleviating such iron deficiencies in growing plants include the application of synthetic iron chelates to soil or the use of various soluble iron compounds as foliar sprays for direct application to the plants. Currently, the least expensive, in terms of up-front per unit cost, water-soluble iron compound in use is iron sulfate, either in its reduced state, e.g., ($FeSO_4$) or in the ferric state, e.g. [$Fe_2(SO_4)_3$]. However, $FeSO_4$ or $Fe_2(SO_4)_3$ should not be applied directly to soil lest either source quickly becomes combined with certain components in the soil to form water-insoluble compounds thereby rendering such iron unavailable to growing plants.

The synthetic chelate FeEDDHA [ferric chelate of ethylenediamine (di-(o-hydroxyphenyl) acetate))] has been deemed to be the most effective iron fertilizer for soil application, especially in calcareous soils (Arthur Wallace, *A Decade of Synthetic Chelating Agents in Inorganic Plant Nutrition*, Edwards Brothers, Inc., Ann Arbor, Mich. 1962). However, the per unit cost or iron in FeEDDHA is quite high, which makes this iron chelate material much too expensive for application to relatively low-value field crops. Another currently available and somewhat less expensive iron chelate material, FeEDTA (monosodium ferric ethylenediamine tetraacetate), has proven to be effective for crops growing in near neutral soils but not in calcareous, high-pH soils wherein most iron deficiencies occur. Nevertheless, the initial per unit cost of iron in iron sulfate is significantly lower than in FeEDDHA. Accordingly, iron sulfate would be more economical FAM eminently suitable for field crops if it remained available to growing plants subsequent to its contact or juxtapositioning with the soil situs. Therefore, additives or conditions which can significantly improve the effectiveness of iron sulfate for the treatment of chlorosis could, in turn result in an economically effective iron source FAM for soil application.

Currently, it is the practice in the trade for iron-containing or iron source FAMs to either be applied to soil separately or to be incorporated with other materials in the processing or blending of fertilizers. The effectiveness of iron source FAMs in maintaining a supply of iron to growing plants depends upon the chemical nature of the iron source materials and/or the soil, as well as their rate and/or frequency of application. Economic considerations regarding the use of iron source FAMs are determined by their costs and rate of application relative to the returns attributable to increased yields of the crops to which they are applied. Presently, the most effective iron chelate, FeEDDHA, is so costly that its use is restricted to high-cash value crops such as, for example, apples, grapes, and peaches, while the least costly, on a front-end per unit cost basis, iron source FAMs are ineffective when used in procedures designed to correct iron chlorosis in many lower value crops, such as, for example, grain sorghum and soybean.

From the aforesaid, it should now be abundantly clear that the prior art materials designed as, or intended to be, iron source FAMs are either too costly up front to be economical for use on most field crops or although available at relatively low unit cost, are still highly uneconomical to use since they are ineffective in maintaining a supply of available iron to crops growing on iron-deficient soils.

For the past 30 years, gel-forming hydrophilic polymers have been used to improve aggregation of soil particles as well as improving the storage capability and efficiency by which plants use water. One unique physical property of hydrophilic polymers is that they will retain up to 500 times their own weight of water in their chemical structure (Michael Johnson, The effect of gel-forming polyacrylamides on moisture storage in sandy soils, *Journal of Science of Food and Agriculture* 35:789-793, 1984). While this water can be removed rather rapidly from these polymers by applying heat thereto or rather slowly therefrom by allowing same to evaporate therefrom in the open air, these polymers will normally retain this water for long period of time in moist soil. Early use of such polymers in agriculture declined because these products, mainly starch based co-polymers and early prototypes of crosslinked acrylamide co-polymers were quite susceptible to microbial decomposition and had poor salt buffering properties (Michael Johnson and Cornelius Veltkamp, Structure and functioning of water-storing agricultural polyacrylamides, *Journal of Science of Food and Agriculture* 36:789-793, 1985).

Recent research and development of controlled release nitrogen fertilizers has included use of hydrophilic polymers as carriers of nitrogen solutions. Results of leaching column studies with soil-applied urea-ammonium nitrate showed that nitrate leaching losses were delayed up to 6 weeks when various polymer gels were included (Robert Mikkelsen and David Behel, Jr., Gelled fertilizers as slow/delayed release nutrient sources, *Agronomy Abstracts*, American Society of Agronomy Annual Meeting, Anaheim, Calif., p. 303, 1988). In a more recent study, gels of three polymers (polyacrylate, vinyl-alcohol, and starch-based) containing various nitrogen fertilizers released most of the contained nitrogen after only 7 days, but some of the nitrogen was retained by the gels up to 28 days; the water-holding capacity of each polymer varied with nitrogen source and concentration of the fertilizer solution (Jonathan Smith and Helen Harrison, Evaluation of polymers for controlled release properties when incorporated with nitrogen fertilizer solutions, *Communications in Soil Science and Plant Analysis* 22:559-573, 1991).

Results of investigations leading to the making of the instant invention have led to the unexpected discovery that the use of hydrated polymers as a matrix for soluble iron fertilizers provides a novel method for improving the efficiency of iron uptake by plants in calcareous soils. In the practice of a principal embodiment of the instant invention aqueous solutions of $FeSO_4$, $Fe_2(SO_4)_3$ or other soluble inorganic iron salts are absorbed by polymers to form gels which are then applied to soil, most preferably by banding. Because some polymers herein tested, are only slowly biodegraded in soil, it is anticipated that hydrogels of these materials will provide available iron for crops over a long period of time. A parameter which appears to have principal effects on the practice of the instant invention is the realization that the water-holding capacity of polymers may be decreased with increased Fe concentrations in the solution being absorbed because soluble salts decrease water absorption of gel-forming polymers (Michael Johnson, Effect of soluble salts on water absorption of gel-forming soil conditions, *Journal of Science of Food and Agriculture* 35:1063-1066, 1984). This could limit the concentration of iron in the solution, or require higher polymer concentrations to provide an adequate gel.

B. Second Embodiment—Micronutrient Delivery System It has been recognized that there is an increasing need for supplying micronutrients to crop plant-soil situses, because the natural supply of such micronutrients is insufficient to produce high crop yields in many of the soils in this country. This need has been accentuated by use of high-analysis fertilizers containing relatively small amounts, if any, of many micronutrient sources being removed from the soil. In addition to the need for micronutrient iron, as discussed in detail, supra, there are principal needs for amounts of many other micronutrients, some of the principal ones being zinc, copper, and manganese. The need for considering these and other micronutrients is documented in *Micronutrients in Agriculture*, 2nd, Ed., John Mortvedt, et al. (eds) Soil Science Society of America, Madison, Wis., 1992.

One approach to supplying such micronutrients to the proper soil situs has been to incorporate same in liquid or solid fertilizers during the production thereof, to thereby utilize the resulting micronutrient-enriched fertilizers as carriers or delivery systems of same to the crops. Early work by Stinson, et al., as reported in U.S. Pat. No. 3,244,500, Apr. 5, 1966, assigned to the assignee of the present invention, recognized that if water-insoluble micronutrient sources are utilized for incorporation in liquid fertilizers they unfortunately remain in water-insoluble form and, therefore, unavailable to the plants in which they are thereby delivered. Accordingly, Stinson, et al., teach that the water-soluble sulfate salts of micronutrients, which apparently became insoluble reaction products when they were incorporated in solid fertilizers at the time of their invention, would remain in water-soluble form in liquid fertilizers if the phosphoric acid utilized for the production thereof contained prescribed amounts of so-called polyphosphoric acids.

In that area of the art devoted to incorporating of micronutrients with solid fertilizers, such as in granular form, there evolved three general methods by which to add micronutrients to granular macronutrients, namely, dry blending, incorporation during granulation, and coating onto the surface of the finished fertilizer granules. An example of an improvement in the last approach is shown in U.S. Pat. No. 3,423,199, Philen, et al., Jan. 21, 1969, assigned to the assignee of the present invention, where in effect Philen, et al., teach the coating of hygroscropic fertilizer granules with micronutrient powders, which when wetted with water and/or steam react with the fertilizer constituent at the granule surface to form in situ stabilized compounds. The resulting complex fertilizer granules are thereby improved in their physical property characteristics and also act as delivery systems for micronutrient fertilizer elements.

Such heretofore devised micronutrient delivery systems have been fairly successful in that they place the materials to be delivered in a form suitable for use with either commercially available liquid fertilizer application equipment or commercially available solid granular application equipment. In addition, the incorporation of micronutrients in or with the fertilizers makes the delivery thereof to the farmer more convenient since he is not required to make a separate trip to the fields for application of fertilizer and also for application of micronutrients. However, it will be appreciated that these types of delivery systems utilize the so-called shotgun approach which require the use of substantial amounts if micronutrients and result in distribution of same to non-deficient areas of the field, it being understood, of course, that if the solid or liquid fertilizers are band applied, this somewhat wasteful practice is more limited. It will be further appreciated that there are instances wherein it will be highly desirable to be able to deliver and place the micronutrient at a situs deemed optimum for a particular plant or crop. Since the second or alternate embodiment of the instant invention is directed to the placement of micronutrients within islands or veins of hydrated polymers enriched with same, and further since it has now been discovered that once the plant roots find such a region there is a propensity for exaggerated root growth and development into and throughout said region, it can now be appreciated that this new delivery in effect focuses or concentrates or directs a substantial portion of a plants root development in a manner to most effectively and efficiently utilize such micronutrients.

SUMMARY OF THE INVENTION

It has now been discovered that the combination of certain hydrophilic organic polymers, namely, polyacrylamides, or some polyacrylamide-polyacrylate mixtures with certain iron source FAMs, particularly those comprising iron sulfates, result in materials which, after soil application, have substantially enhanced availability of iron to plants at or near the application situs.

These gel-forming polymers, or simply polymers, which are mostly characterized as gels when mixed with iron solutions, may conveniently be band applied to soil. It will be appreciated that the semi-solid, thixotropic nature of a gelled fluid material lends itself to extrusion-type application, much like toothpaste squeezed from the tube. Accordingly, the application of these gel materials in relatively narrow bands, on the order of about ¼ to ½ inches in width, along or parallel to the seed row or spot placed in the root zone of living plants is normally the easiest and most convenient manner of distribution.

It would appear that the principal mechanisms which are responsible for preserving, for a substantial period of time, these iron source FAMs in a form which ultimately is readily available to growing plants is one of isolation of such materials from the deleterious effects of or combinations with soil components, including aqueous media, at or near the application situs. In addition, it has been discovered that the preferred methods of application, namely, band application to soil at or prior to planting or spot application in the root zone of growing plants in soil, result in isolating such materials from reacting with the soil to form compounds which are unavailable to plants.

Preliminary investigations indicate that these iron source FAM and polymer combinations applied as gels are effective for use on a wide variety of iron-sensitive crops growing on iron-deficient soils. It has also been discovered that they may be band applied near the seed row at planting. In addition, it is proposed that they may be used as specialty fertilizers to other crops, providing they are spot placed in the root zone or what will be the root zone in the soil rather than on the soil surface. They may be especially beneficial for perennial crops such as certain fruit trees, grape vines, and shrubs because biodegradation of these organic polymers buried within soil occurs slowly.

One of the principal difficulties, which has beset investigators in their attempts to find and/or formulate gel type fertilizers for a number of agricultural applications and principally for those relating to designing slow release or controlled release fertilizers, has been the singular characteristic of such gelled materials to exhibit essentially no resistance to the leaching effects of downward-moving water, including that experienced from heavy rainfalls or various types of irrigation arrangements. This most undesirable characteristic has been attributed to the vary nature of gels, i.e., materials which oftentimes are possessed with or exhibit thixotropic properties whereupon application of sheer energy to the semisolid phase thereof effects a change to a more fluid or substantially less viscous phase. The net result of this undesirable property is that gels which are surface applied or, for that matter barely tilled into the soil, relieve themselves of the very materials that they are supposed to encapsulate when such gels are exposed to the movement of either percolating ground water in the tilled-in mode or impinging rainwater in the surface-applied mode. It has now unexpectedly been discovered that soluble iron contained in these gelled materials is retained in the gels instead of being dissolved/leached from the gels by the action of downward-moving water in soil.

Investigations into the utilization of a number of micronutrients in combination with the gels utilized various combinations thereof. As in the case of the iron source FAM, supra, these materials were conveniently band applied to the soil in essentially the same semisolid, thixotropic gelled fluid state and utilized the same extrusion-type application equipment and placement. This procedure established veins of the micronutrient FAM plus polymer material in the immediate vicinity anticipated for plant root development and after sufficient time had elapsed for such development, cross sectioning of such veins and observing the soil matrix surrounding same clearly showed an unusual propensity of root and root hair growth in the polymer region in preference to the surrounding soil matrix thereby clearly establishing that such delivery system focuses plant root development in a fashion whereby contact with and uptake of micronutrients in such veined regions is not only substantially enhanced but is, indeed, totally optimized.

Another aspect of this invention relates to a method of enhancing the yield and/or growth of plants by distribution the composition of this invention in the "plant growth media" in which the plants are being grown within reach of the root system of the plants (hereinafter referred to as "root zone"). As used herein, the term "plant growth media" refers to various natural and artificial media which support plant growth, including but not limited to soil, potting mixtures of organic and inorganic matter and artificial media such as polyurethane foam.

Yet another aspect of this invention relates to a method of inhibiting the degradation of certain water-soluble iron source micronutrient materials, principally iron sulfates, including ferric sulfate or ferrous sulfate or both, when said iron source micronutrients are applied to such plant growth media, which aspect comprises providing an effective isolation of said water-soluble iron source micronutrients from said plant growth media such that same do not react with components therein in a fashion whereby the iron sulfates form water-insoluble or substantially water-insoluble compounds, which water-insoluble compounds are or become unavailable to plant growth sought to be treated with such iron source micronutrients. A principal embodiment of this invention, which provides such effective isolation is the encapsulation or containment of iron sulfates in a hydrophilic material such as polyacrylamides formed by reacting relatively small amounts of polyacrylamides with water or other aqueous media into which is first dissolved such iron sulfates. Practice of the instant invention ensures that iron sulfates so processed remain substantially water-soluble in the resulting formed hydrogel. As used herein, the term "effective isolation" refers to the protective mechanism of encapsulation of the iron sulfates, supra, in a gel formed with water and one or more gel-forming polymers and encompasses an isolation or separation so effective that all of most of the so-treated iron sulfates remain substantially water-soluble for at least a period of about 2 weeks and preferably a period ranging from at least about 4 to about 6 weeks, more preferably at least about 90 days, and most preferably for a period of time ranging upwards to 1 to 5 years, or more. As used herein, the term "hydrogel" refers to the product resulting from dissolution of effective amounts of one or more selected micronutrients dissolved in aqueous media and subsequently admixed with predetermined amounts of selected gel-forming polymers, including polyacrylamides, having a predetermined degree of crosslinking up to preferably about 10%, and thereafter phase changed from a relatively low viscosity fluid mixture to a semi-solid gel material. As used herein, the term "substantial water-soluble" encompasses materials which are initially water-soluble such as ferric sulfate or materials which have only degraded, by reaction with components in growth media to the point that the resulting reaction products in combination with the unreacted materials, in the aggregate, provide a material which is at least about 60% water-soluble. As used herein, the term "root zone" refers to that area in the plant growth media within the reach of the root system of a particular desired plant or crop and in the field normally comprises that portion of the soil matrix generally beneath the seed planting band and areas juxtaposed thereto, generally parallel with the band ad protruding downwardly from a few inches to perhaps about a foot. In the practice of the invention there will oftentimes be provided veins or islands of micronutrient-enriched hydrogel through such root zone in a fashion such that any plant roots entering therein will be provided with an environment enhanced both mechanically and nutritionally by virtue of the uniformity of consistency of a hydrogel which is considerably more easily penetrated and expanded into than is a normal soil matrix and which by virtue of copious amounts of water of hydration available to the roots growing therein, as well as the abundant supply of desirable micronutrients, provides a micro-environment wherein root growth is substantially enhanced. As sued herein, the term "enhanced root growth region" refers to such plant growth media discontinuities comprising micronutrient-enriched hydrogels of the type herein contemplated and referenced.

OBJECTS OF THE INVENTION

It is therefore a principal object of the present invention to provide new and improved methods, as well as new combinations of materials which are eminently suitable for supplying iron to soil systems and/or to the situs of growing plants for substantial periods of time of at least about 14 days, preferably of at least about 28 days, and most preferably of at least about 45 days, and in a form such that they can readily be absorbed by the roots of such growing plants, i.e., completely, or at least about 60% water-soluble.

Another principal object of the present invention is to provide new and improved methods, as well as new combinations of materials eminently suitable for supplying iron to soil systems and/or to the situs of growing plants for substantial periods of time and in a form such that although such materials may be band applied near the seed row in soil or spot placed directly in the root zone of growing plants, they will be in a form readily available for absorption by the roots of such growing plants.

A still further principal object of the present invention is to provide new and improved methods, as well as new combinations of materials eminently suitable for soil applications and for supplying iron to soil systems and/or to the situs of growing plants in a form such that they will be absorbed by the roots of such growing plants and wherein such materials comprise either separate components or admixtures of components including certain organic gel-forming polymers and iron source FAMs, said iron source FAMs including ferrous and ferric sulfate.

Another object of the present invention in a principal embodiment thereof is to provide new procedures to effect the mixing of certain gel-forming polymers with aqueous iron-containing solutions and to result in the formation of gels which can subsequently be applied to soil situses to provide thereat sufficient available iron as may be required by growing plants.

Still another object of the present invention in a second embodiment thereof is to provide new procedures and techniques for effecting combinations of certain gel-forming polymers with a variety of micronutrient sources and to result in the formation of gels which can subsequently be applied to soil situses to act as a most efficient delivery system for such micronutrients, and for uptake by growing plants in a manner wherein upon contact and penetration of said gel the plant roots evidence an unusual propensity for further growth thereinto, whereby the uptake of micronutrient values are more effectively utilized than they could be if homogeneously mixed in the surrounding soil matrix.

Still further and more general objects and advantages of the present invention will appear from the more detailed description set forth in the following disclosure and examples, it being understood, however, that this more detailed description is given by way of illustration and explanation only and not necessarily by way of limitation, since various changes therein may be made by those skilled in the art without departing from the true spirit and scope of the gist underlying the present invention.

DESCRIPTION OF THE PREFERRED EMBODIMENTS

The present invention is directed to methods of mixing, as well as specific compositions utilized therein for applying to a designated soil situs, various arrangements, combinations, and/or mixtures of certain hydrophilic polymers and selected water-soluble compounds of iron including, in the most preferred embodiments, ferrous sulfate, or ferric sulfate. Practice of the instant invention results in improved fertilizers having incorporated therein water-soluble compounds or iron in forms wherein same are sufficiently isolated, at least temporarily, from contact with soil media but are juxtaposed such media such that the iron values therein remain available to maintain the prerequisite supply of iron in a form readily useful to plants growing at or near such situs.

Application of relatively inexpensive iron-containing fertilizers or iron FAMs to iron-deficient soils and maintenance of this applied iron in a state wherein it remains available to growing plants can be accomplished by a number of different procedures including the mixing of selected polymers with iron sulfate in proper proportions. For convenience to the reader, a selected few of such procedures are described below.

Iron sulfate (ferrous or ferric) is dissolved in water, usually at temperatures between about 10° C. to 30° C., to yield a solution having a concentration ranging between about 0.1 percent to about 0.5% iron. Sine $FeSO_4$ and $Fe_2(SO_4)_3$ each contain about 25% iron, respectively, this requires from about 4 to 20 grams of $FeSO_4$ or $Fe_2(SO_4)_2$ per liter of water. About 40 to about 50 grams of powdered polymer, selected from the group comprising polyacrylamides or polyacrylamide-polyacrylate mixtures are slowly added with constant agitation, over a period of about 10 minutes, to a liter of the resulting iron-containing solution to form a resulting gelled product. It has been found that it is preferable to supply substantial shear energy to the solution during the addition of the polymer. This is conveniently accomplished by use of a stirring apparatus. The resulting hydrated polymer and fertilizer formulation subsequently may be band applied, at a rate ranging between about 4 to about 40 pounds of iron per acre, preferably 1 to 3 inches, below the soil surface and near to (1 to 2 inches horizontally) the seed row at or prior to planting, or spot placed in the root zone of growing plants. In the instance of gel combinations with other micronutrients such as, just for instance, zinc, copper, and/or manganese, the sulfate forms can likewise be conveniently utilized as in the case of iron, supra, but with the maximum concentration thereof increased about fourfold since delivery rather than isolation characteristics of the gel, are of principal interest and the decreased water-holding ability with increased salt concentration therein is not as important to chance such isolation properties. This factor of at least a 4:1 relationship is very helpful as a rule of thumb, so long as isolation of iron from the deleterious effects of soil contact is not the prime consideration. Also, because of the very limited tolerance of plant life to copper, this general rule must, obviously, be adjusted therefore.

EXAMPLES

In order that those skilled in the art may better understand how the present invention can be practiced, the following examples are given by way of illustration only and not necessarily by way of limitation, zinc numerous variations thereof will occur and will undoubtedly be made by those skilled in the art without substantially departing from the true and intended scope and spirit of the instant invention herein taught and disclosed.

Several greenhouse pot experiments were conducted to determine availability of iron in various iron source FAM and polymer formulations, with each formulation being applied in a band (¼ to ½-inch in width and 4 to 6 inches long at a depth of 2 inches below the soil surface and 1 inch away from the seed row to a calcareous iron-deficient soil at an application rate ranging between about 10 and about 40 pounds of iron per acre. For comparison purposes, each iron fertilizer, namely iron (ferrous or ferric) sulfate and FeEDDHA was band applied by itself at the same soil depth and distance from the seed row.

In the following first six examples, unless otherwise indicated, all parts and percentage compositions are by weight. Each pot was 6 inches in diameter and was charged with about 1 kilogram of Epping silt loam soil. The soil in all greenhouse pots was fertilized uniformly with all known plant nutrients except iron at rates known to provide optimum plant response, so that any crop responses could be attributed to iron contained in the various materials, including polymer-iron source FAM mixtures, or iron source FAMs or FeEDDHA applied as control. See Konrad Mengel, and E. A. Kirkby, *Principles of Plant Nutrition,* International Potash Institute, Bern, Switzerland (1982), herein incorporated by reference thereto, for an example of the variety and concentrations of micronutrients used to satisfy such requirements. The test crop for all experiments was grain sorghum (*Sorghum bicolor* L. Moench), cultivar RS-626, a variety known to be susceptible to iron chlorosis when grown on iron-deficient soils such as the Epping silt loam type herein used. Three replicates of each treatment were used in a completely randomized design. Deionized water was used during the entire growth period and forage was harvested after 6 weeks' growth.

In Example VII, infra, a second embodiment of the instant invention is described. It relates to preparing a gel containing a proper diet of micronutrients, which may include only iron or other soil-specific remedies for a given situs such as, for example, zinc, or it may include a whole multitude of micronutrients recommended for certain crops, ornamentals, or other specific plant types.

The resulting gel products, containing a proper diet of required micronutrients, have been determined to act to more effectively deliver to the plants treated therewith such nutrients contained therein. It is believed that these products act to focus the beneficial efforts of such therein contained micronutrients due to the fact that proper placement thereof at the soil situs juxtaposed the plant root effectively causes or enhances root development and growth to and throughout the regions of soil displaced by "islands" or "veins" of such gels.

Accordingly, a first series of tests was designed to test the response of corn to zinc (added in the gel by first dissolving about 0.2% by weight of zinc sulfate in water at about 20° C. and thereafter adding, over a period of about 5 minutes, sufficient polyacrylamide to comprise about 4.5% by weight in the resulting gel. Testing in 6-inch pots was in a suitable zinc-deficient soil such as, for example, Crowley silt loam.

A second series of tests was designed to test the results of utilizing, in combination with about 0.4% by weight of polyacrylamide, a combination of a diet rich in all of the micronutrients. For an example of the variety and concentrations of materials used to satisfy such requirements, see Konrad Mengel, and E. A. Kirkby, *Principles of Plant Nutrition,* International Potash Institute, Bern Switzerland (1982). As in testing procedures shown in other examples, the application rates for zinc, supra, are 3 and 12 mg/pots and for the full rich diet of all micronutrients 60 mg/pot and 100 mg/pot. In both such series of tests, projected results correlate with the hypothesis that such procedure will very effectively act to focus plant root growth in the specific regions and areas of micronutrient placement and thereby provide a new, improved, and highly efficient, both technically and economically, delivery systems for micronutrients to preselected plants or plant pots.

EXAMPLE I

In the tests comprising this example, iron sulfate, in the reduced state, was band applied according to the procedures outlined above to a calcareous iron-deficient soil of the type Epping silt loam either alone or in combination with one of each of five hydrophilic polymers of varying chemical structures, to wit, polyacrylamide, polyacrylamide plus polyacrylate, polyacrylate, cellulose ether, and guar. The procedure used to prepare the gels comprising the polymer and iron sulfate combination was as described above in the description of the preferred embodiments, i.e., the prerequisite amount of iron sulfate was dissolved in water held at about 20° C. and thereafter, the prerequisite amount of polymer was added thereto over a period of about 10 minutes during which the iron solution into which such polymer was added was kept in a state of constant agitation wherefrom resulted a thixotropic gel which could be easily loaded into, for example, a 10-ml syringe which was used as an applicator and subsequently could be extruded therefrom for purposes of forming ¼-inch wide to ½-inch wide bands onto the soil in the test pots, or alternatively, to inject a desired amount of the resulting gel combination beneath the soil surface to depths of preferably about 1 to 4 inches. Each combination polymer and $FeSO_4$ formulation contained 4.5% polymer and 0.12% iron calculated as Fe. The chelate, FeEDDHA, also was similarly band applied alone to soil. All iron FAMs were applied at two different rates, e.g., at 12 and at 36 mg of iron per kilogram of pot soil. It should be noted that in the test comprising this Example I, as well as in Examples II through VI, described in detail infra, typical 6-inch (150-millimeter) diameter greenhouse pots were used, with each 6-inch pot containing, on the average, 1 kilogram of iron-deficient soil. Also, typical to iron response tests, the potted crop was sorghum since it has long been used as a standard for such types of testing with 8 plants being maintained in each pot. See, for example, Aubra Mathers, Effect of ferrous sulfate and sulfuric acid on grain sorghum yields, *Agron. J.* 62:555–556 (1970). Typically, after six weeks of growth in the greenhouse environment the above-ground plant forage was harvested, dried, and weighed to determine response to testing materials relative to sorghum gown in pots as standards. Sorghum forage yields were highest with FeEDDHA which was previously known to be the most effective iron fertilizer, see Table I, infra. Crop response was lowest with $FeSO_4$ band applied alone, but forage yields and iron uptake by sorghum were much higher with three of the five $FeSO_4$ and polymer formulations. These polymers were either a polyacrylamide, a polyacrylate, or a commercial product containing a mixture of the two polymers of unknown proportion, thereof. These results suggested that availability of the iron in these combined gel $FeSO_4$ and polymer formulations was maintained throughout the 6-week growth period.

TABLE I

| Test No.[2] | Source/ Wt. % of Fe | Source/Wt. % of polymer | Fe band applied to soil (mg/pot)[1] | | | |
|---|---|---|---|---|---|---|
| | | | 12 | 36 | 12 | 36 |
| | | | Dry yield (g/pot) | | Fe uptake (mg/pot) | |
| 1 | FeEDDHA (100%) | — (0%) | 54.9 | 56.8 | 2.86 | 4.72 |
| 2 | $FeSO_4$ (100%) | — (0%) | 12.8 | 29.9 | 0.75 | 1.58 |

TABLE I-continued

| Test No.[2] | Source/ Wt. % of Fe | Source/Wt. % of polymer | Fe band applied to soil (mg/pot)[1] | | | |
|---|---|---|---|---|---|---|
| | | | 12 | 36 | 12 | 36 |
| | | | Dry yield (g/pot) | | Fe uptake (mg/pot) | |
| 3 | FeSO$_4$ (0.12) | polyacrylamide (4.5) | 48.6 | 45.9 | 1.90 | 1.83 |
| 4 | FeSO$_4$ (0.12) | polyacrylamide + polyacrylate[3] (4.5) | 31.2 | 43.1 | 1.83 | 1.86 |
| 5 | FeSO$_4$ (0.12) | polyacrylate (4.5) | 28.6 | 42.2 | 1.31 | 1.92 |
| 6 | FeSO$_4$ (0.12) | cellulose ether (4.5) | 20.0 | 32.8 | 0.85 | 1.41 |
| 7 | FeSO$_4$ (0.12) | guar (4.5) | 15.7 | 36.7 | 1.01 | 1.76 |

[1]Dry matter yield (3 replicates) for the zero-Fe control was 9.4 g/pot and Fe uptake was 0.48 mg/pot.
[2]Three replicates used in all tests.
[3]Percentage of each polymer in this commercially available product has been reported to be about 50%.

EXAMPLE II

In the tests comprising this example, two of the polymers which performed well in the first experiment (Table I, test numbers 3 and 4, supra) were band applied in the FeSO$_4$ as gels to soil. The same fertilizing, planting, and cropping procedures used in Example I, above, were followed in these tests except that, in addition to such procedure each of these FeSO$_4$ and polymer formulations was acidified with 93% by weight sulfuric acid to pH 4.6 prior to soil application. Both FeSO$_4$ and FeEDDHA were each band applied alone to soil and all iron source FAMs were applied at rates of either 12 or 36 mg of iron per pot. As in Example I, supra, in this and subsequent examples, the reference to band application is understood to mean the procedure set forth in the introductory portion of this section. Crop response again was greatest with FeEDDHA and poorest with FeSO$_4$, which each of those materials being band applied alone to soil (See Table II, infra). Crop response to FeSO$_4$ again was much improved when FeSO$_4$ was band applied as a gel which was formed with each polymer prior to banding. As may be seen from the data shown in Table II below, acidification of each material comprising both a hydrated polymer and FeSO$_4$ did not increase their effectiveness as iron source FAM fertilizers.

TABLE II

| Test No.[2] | Source/ Wt. % of Fe | Source/Wt. % of polymer[3] | Fe band applied to soil (mg/pot)[1] | | | |
|---|---|---|---|---|---|---|
| | | | 12 | 36 | 12 | 36 |
| | | | Dry yield (g/pot) | | Fe uptake (mg/pot) | |
| 1 | FeEDDHA (100%) | — (0%) | 32.6 | 31.2 | 2.15 | 2.34 |
| 2 | FeSO$_4$ (100%) | — (0%) | 7.0 | 13.0 | 0.65 | 0.64 |
| 3 | FeSO$_4$ (0.12%) | A (4.5%) | 22.0 | 23.6 | 1.72 | 1.30 |
| 4 | FeSO$_4$ (0.12%) | B (4.5%) | 16.6 | 22.7 | 1.00 | 1.42 |
| 5 | FeSO$_4$ (0.12%) | acidified A (4.5%) | 24.9 | 22.2 | 1.77 | 1.36 |
| 6 | FeSO$_4$ (0.12%) | acidified B (4.5%) | 17.8 | 23.9 | 1.02 | 1.30 |

[1]Dry matter yield (3 replicates) for the zero-Fe control was 3.9 g/pot and Fe uptake was 0.26 mg/pot.
[2]Three replicates used in all tests.
[3]A-polyacrylamide. B-commercial polyacrylamide and polyacrylate mixture, the particular mixture used was identified as containing about equal parts of the two constituents, however, there are indications that very satisfactory mixtures may comprise polyacrylamides in admixture with from as little as about 10% polyacrylates to perhaps as much as about 60% polyacrylates.

EXAMPLE III

Again, all of the iron source FAMs which were used in the second experiment above, e.g., Example II, test numbers 1 and 2 supra, were again band applied to the same iron-deficient type soil. In this example, essentially the same testing procedure used in Example I, supra, was utilized except that the sorghum planting date was delayed for 6 weeks after fertilizer application. Results from this example indicate that each combined FeSO$_4$ and polymer formulation was not as effective as in the previous experiments wherein sorghum was planted immediately after fertilizer application. Sorghum forage yields and iron uptake with each non-acidified FeSO$_4$ and polymer formulation were equal or lower than that obtained with FeSO$_4$ band applied by itself (see Table III, infra). However, crop response was greater with the acidified FeSO$_4$ and polymer formulations than with FeSO$_4$ band applied along. These test results indicate that effectiveness of these FeSO$_4$ and polymer formulations may decrease with time after application to soil. In conventional practice, iron fertilizers generally are band applied to the soil situs at or about the time of planting.

TABLE III

| Test No.[2] | Source/ Wt. % of Fe | Source/Wt. % of polymer[3] | Fe band applied to soil (mg/pot)[1] | | | |
|---|---|---|---|---|---|---|
| | | | 12 | 36 | 12 | 36 |
| | | | Dry yield (g/pot) | | Fe uptake (mg/pot) | |
| 1 | FeEDDHA (100%) | — (0%) | 39.6 | 36.3 | 1.91 | 2.34 |
| 2 | $FeSO_4$ (100%) | — (0%) | 13.8 | 27.4 | 0.57 | 0.89 |
| 3 | $FeSO_4$ (0.12%) | A (4.5%) | 27.6 | 16.9 | 1.13 | 1.61 |
| 4 | $FeSO_4$ (0.12%) | B (4.5%) | 16.7 | 22.8 | 0.54 | 0.75 |
| 5 | $FeSO_4$ (0.12%) | acidified A (4.5%) | 25.7 | 32.0 | 1.19 | 1.38 |
| 6 | $FeSO_4$ (0.12%) | acidified B (4.5%) | 20.2 | 38.3 | 0.70 | 1.52 |

[1] Dry matter yield (3 replicates) for the zero-Fe control was 7.5 g/pot and Fe uptake was 0.23 mg/pot.
[2] Three replicates used in all tests.
[3] A-polyacrylamide, B-commercial polyacrylamide and polyacrylate mixture, the particular mixture used was identified as containing about equal parts of the two constituents, however, there are indications that very satisfactory mixtures may comprise polyacrylamides in admixture with from as little as about 10% polyacrylates to perhaps as much as about 60% polyacrylates.

EXAMPLE IV

The test conditions used in this example were similar to those used in Example I, supra, except that several $FeSO_4$ and polymer formulations, varying in viscosity, were prepared by changing the percentages of $FeSO_4$ and polyacrylamide in each formulation. These formulations were band applied to soil at rates of either 12 or 36 mg of iron per pot. In addition, the same amounts of $FeSO_4$ and polymer that were used in the hydrated $FeSO_4$ and 4.5% polymer formulation (test number 3 infra) each were mixed and the resulting dry admixture was placed in the same band in soil in powder form. Crop response to the $FeSO_4$ and polymer formulations varied with composition of the banded gels (see Table IV, infra). The most effective gel was the formulation containing 0.12% iron as $FeSO_4$ and 4.5% polymer which also was the most viscous. Effectiveness as iron source FAMs decreased with increasing total percent iron in the gel. Decreasing the percentage of polymer from 4.5% to 2.25% in the gel had less effect than changing the percentage of iron (from 0.12 to 0.36%) in these gels. Including the same amount of polyacrylamide polymer as a powder in the same band with powdered $FeSO_4$ in the soil resulted in lower crop response (test number 8 compared with test number 3). This indicated that while a gel formed in the soil after band application by absorbing water from the soil, which then maintained the iron sulfate in a form available to growing plants, the volume of the gel was less than that in the treatments where it had been formed prior to soil application. Therefore, the $FeSO_4$ must be contained within a sufficient volume of banded gel to protect the applied iron from reacting with the soil to become unavailable to growing plants.

TABLE IV

| Test No.[2] | Source/ Wt. % of Fe | Wt. % of Polyacryl- amide | Fe band applied to soil (mg/pot)[1] | | | |
|---|---|---|---|---|---|---|
| | | | 12 | 36 | 12 | 36 |
| | | | Yield (g/pot) | | Fe uptake (mg/pot) | |
| 1 | FeEDDHA (100%) | 0 | 31.1 | 31.3 | 1.79 | 1.95 |
| 2 | $FeSO_4$ (100%) | 0 | 10.7 | 13.3 | 0.44 | 0.81 |
| 3 | $FeSO_4$ (0.12%) | 4.5 | 26.6 | 30.1 | 1.14 | 1.69 |
| 4 | $FeSO_4$ (0.24%) | 4.5 | 17.5 | 24.8 | 0.60 | 1.08 |
| 5 | $FeSO_4$ (0.36%) | 4.5 | 9.6 | 22.2 | 0.38 | 1.00 |
| 6 | $FeSO_4$ (0.12%) | 2.25 | 14.7 | 30.0 | 0.66 | 1.70 |
| 7 | $FeSO_4$ (0.36%) | 2.25 | 14.7 | 23.4 | 0.64 | 0.97 |
| 8 | $FeSO_4$ (100.0%) | 4.5[3] | 18.7 | 27.4 | 0.93 | 1.56 |

[1] Dry matter yield (3 replicates) for the zero-Fe control was 6.0 g/pot and Fe uptake was 0.22 mg/pot.
[2] Three replicates used in all tests.
[3] Powdered polymer mixed with powdered $FeSO_4$ and band applied as a dry admixture directly to soil.

EXAMPLE V

Testing procedures similar to those used in Example I, supra, were followed; however, several experimental polyacrylamides (B, C, and D) which varied in the degree of crosslinking, namely 0.2%, 0.8%, and 2.0%, respectively, were used in addition to the commercial crosslinked polyacrylamide used in Examples I to IV. Hydrated formulations of $FeSO_4$, FeEDTA, or $Fe_2(SO_4)_3$ plus each polymer were prepared so the percentages of iron and polymer in each preformed gel were 0.12% and 4.5%, respectively. These formulations were band applied to soil at rates of either 12 or 36 mg of iron per pot. Sorghum forage yields and iron uptake were not affected by band application of FeEDTA along on in each polyacrylamide. However, crop response was greater when either FeSO$_4$ / or Fe$_2$(SO$_4$)$_3$ were band applied with a hydrated polymer than alone to soil (see Table V). With FeSO$_4$, forage yields and Fe uptake were highest with polymer A and generally decreased with an increase in cross linking in the polyacrylamide (polymers B, C, and D). In contrast, crop response to Fe$_2$(SO$_4$)$_3$ increased slightly with increases in the degree of cross linking and was lowest with polymer A. These results indicate that the degree of crop response is related to the iron source and type of chemical structure of the polyacrylamide. A more significant effect of changing the degree of crosslinking in the chemical structure was that exhibited on the physical properties of the gel, the gel made with the lowest degree of crosslinking (0.2%) (test numbers 5, 9, and 13) were so thixotropic they were very difficult to apply. A knife had to be used to cut the applied gel from that remaining in the applicator. No problems resulted during application of the other two polymers.

After harvest, the soil in selected treatments was sliced longitudinally along the fertilizer band for purposes of making visual observations. It was found that the gels remained intact in the soil and the plant roots were observed penetrating into and through the gel-fertilizer band, and also proliferating in and juxtaposed the gel-fertilizer band. This indicated that plant root growth is not adversely affected by the iron source FAM contained in the hydrated polymer. In fact, plant root proliferation definitely appears to be enhanced in the gel-fertilizer band. It is postulated that this phenomenon occurs because there is less resistance to growth and mobility of the plant roots in the gel than in the soil matrix.

TABLE V

| Test No.[2] | Source of Fe | Source of Polymer[3] | Fe band applied to soil (mg/pot)[1] | | | |
|---|---|---|---|---|---|---|
| | | | 12 Yield (g/pot) | 36 Yield (g/pot) | 12 Fe uptake (mg/pot) | 36 Fe uptake (mg/pot) |
| 1 | FeEDDHA | — | 31.3 | 31.5 | 1.74 | 1.91 |
| 2 | FeEDTA | — | 25.3 | 30.0 | 1.23 | 1.60 |
| 3 | FeEDTA | A | 25.8 | 29.6 | 1.19 | 2.19 |
| 4 | FeEDTA | B | 27.6 | 30.6 | 1.36 | 1.52 |
| 5 | FeEDTA | C | 28.9 | 25.6 | 1.45 | 1.27 |
| 6 | FeEDTA | D | 25.9 | 28.4 | 1.29 | 1.39 |
| 7 | FeSO$_4$ | — | 11.1 | 9.2 | 0.52 | 0.39 |
| 8 | FeSO$_4$ | A | 27.7 | 28.0 | 1.30 | 1.23 |
| 9 | FeSO$_4$ | B | 13.3 | 24.7 | 0.67 | 1.12 |
| 10 | FeSO$_4$ | C | 16.5 | 22.7 | 1.20 | 0.94 |
| 11 | FeSO$_4$ | D | 11.4 | 19.5 | 0.47 | 0.76 |
| 12 | Fe$_2$(SO$_4$)$_3$ | — | 5.8 | 10.5 | 0.22 | 0.36 |
| 13 | Fe$_2$(SO$_4$)$_3$ | A | 18.2 | 24.3 | 0.84 | 1.33 |
| 14 | Fe$_2$(SO$_4$)$_3$ | B | 19.0 | 25.4 | 0.83 | 1.13 |
| 15 | Fe$_2$(SO$_4$)$_3$ | C | 22.0 | 27.6 | 1.01 | 1.48 |
| 16 | Fe$_2$(SO$_4$)$_3$ | D | 19.0 | 28.0 | 1.00 | 1.53 |

[1] Dry matter yield (3 replicates) for the zero-Fe control was 4.9 g/pot and Fe uptake was 0.18 mg/pot.
[2] Three replicates were used in all tests.
[3] Product A was a commercial crosslinked polyacrylamide, while products B, C, and D were experimental polyacrylamide polymers containing 0.2, 0.8, and 2.0% crosslinking, respectively, in the chemical structure.

EXAMPLE VI

Testing procedures similar to those used in Example I, supra, were followed; however, the preparation procedure was modified to the extent that powdered mixtures of polymers and iron source FAMs were prepared and granulated by compaction in a small pharmaceutical pill-making machine (Colton Model 216). NOTE: Any references made herein to materials and/or apparatus which are identified by means of trademarks, trade names, etc., are included solely for the convenience of the reader and are not intended as, or to be construed, an endorsement of said materials and/or apparatus. Powdered FeSO$_4$ and the powdered hydrophilic polymer are mixed in the proportions of 2.2 parts of polymer per part of FeSO$_4$ or Fe$_2$(SO$_4$)$_3$). The resulting granular products (minus 8 mesh plus 10 mesh size) were subsequently band applied to the iron-deficient soil at rates of either 12 or 36 mg of iron per pot within 1 to 2 inches of the seed row. The group comprising the polymers were formulations of two different polyacrylamides, one polyacrylamide plus polyacrylate mixture, and a cellulose ether. The composition of the granular mixtures was 90% FeSO$_4$ and 10% polymer. One polyacrylamide was band applied as a powder directly with powdered FeSO$_4$ to soil as in Example IV (2.2 parts of polymer per part of FeSO$_4$). The above three polyacrylamide products also were band applied with FeSO$_4$ to soil as gels.

Dry matter yields and iron uptake again were highest with FeEDDHA, the most effective iron source FAM (see Table VI, infra). In contract, none of the pills containing various combinations of gels and FeSO$_4$ proved to be very effective in providing available iron to the growing plants, regardless of polymer type in the formulation. Chlorosis was evident in these plants only 3 weeks after planting and it persisted until the plants were harvested after 6 weeks. During a regrowth period of 6 weeks, plants treated with combination or the granular FeSO$_4$ and polymer formulation died for lack of available iron. Possible reasons for the poor performance of the latter products may have been (a) insufficient free water in the soil to allow enough gel formation to protect the applied FeSO$_4$ from soil reactions and (b) these granules may have been compacted too hard in the pill-making machine to allow absorption of water from the soil. On the other hand, crop response to FeSO$_4$ in the form of gels was excellent, indicating that the applied iron was maintained in an available form in these gels, Dry matter yields and iron uptake were somewhat lower when FeSO$_4$ and the polyacrylamide polymer were both applied as powders in the same band in the soil. Apparently, the resulting gel with this method of application was not as effective in maintaining the applied iron in an form available to the growing plants as shown in Example IV.

Examples I to V illustrated where the objectives of this invention are met. It will, of course, be appreciated by those skilled in this art that the subject hydrated gels are rather difficult to apply and their relatively high cost of application restricts their use to specially crops such as apples, grapes, and peaches. If products and methods of application could be devised which were economically viable and effective for field crops, such as grain sorghum and soybean, they could be applicable for correction of iron chlorosis on much greater land areas. Example VI is included to show that several granular products were tested, but they were not effective in providing available iron to the crop. It is anticipated, however, that other polymers or iron source FAMs combined in the same or different proportions as shown in this example may be effective for crops if applied in powdered mixtures or in granular form to iron-deficient soils. Accordingly, further studies to identify more promising combinations of iron source FAMs and polymers for hits purpose are in progress.

TABLE VI

| Test No.[2] | Source of Fe | Source of Polymer[3] | Form applied[4] | Fe band applied to soil (mg/pot)[1] | | | |
|---|---|---|---|---|---|---|---|
| | | | | 12 | 36 | 12 | 36 |
| | | | | yield (g/pot) | | Fe uptake (mg/pot) | |
| 1 | FeEDDHA | — | alone | 43.8 | 46.0 | 2.31 | 2.57 |
| 2 | FeSO$_4$ | — | alone | 6.5 | 11.6 | 0.19 | 0.43 |
| 3 | FeSO$_4$ | A | gel | 38.0 | 43.5 | 1.33 | 1.70 |
| 4 | FeSO$_4$ | B | gel | 37.6 | 43.8 | 1.17 | 1.79 |
| 5 | FeSO$_4$ | C | gel | 34.3 | 41.7 | 1.11 | 1.65 |
| 6 | FeSO$_4$ | A | powder | 10.7 | 18.3 | 0.33 | 0.59 |
| 7 | FeSO$_4$ | A | granular | 7.4 | 10.7 | 0.23 | 0.38 |
| 8 | FeSO$_4$ | B | granular | 9.7 | 13.2 | 0.31 | 0.37 |
| 9 | FeSO$_4$ | C | granular | 6.3 | 11.4 | 0.24 | 0.40 |
| 10 | FeSO$_4$ | D | granular | 7.0 | 11.3 | 0.21 | 0.30 |

[1] Dry matter yield (3 replicates) for the zero-Fe control was 6.3 g/pot and Fe uptake was 0.21 mg/pot.
[2] Three replicates used in all tests.
[3] A and B-each different commercial polyacrylamides, C-polyacrylamide and polyacrylate mixture, D-cellulose ether.
[4] All gel products contained 4.5% polymer and all granular products contained 10% polymer, and the powder form contained the same relative amounts of FeSO$_4$ and polymer that were used in the hydrated product.

EXAMPLE VII

The visual observations in Example V, supra, which indicated the accelerated growth characteristics of plant roots in the veins of gel in soil matrix led to the development of a second embodiment of the instant invention. Since such gels can act to focus some or a large portion of root growth, depending on relative amounts used and placement thereof, the incorporation of other materials, in particular, the plethora of other micronutrients necessary for plant development and growth, in such gel material can be utilized as a totally new form of plant nutrient delivery system. Thus, a powdered mixture of soluble plant nutrients as, for example, those listed in Table VII, below and used in the relative proportions to one another as shown therein can be incorporated with or without the usual amounts of iron sulfates used in other examples of these teaching and in amounts aggregating preferably more than about 0.2% and preferably less than about 2% by weight, in the solution into which the powdered polymer is later added and admixed therewith, again preferably over a period of time ranging from about 1 to 10 minutes and at mixing temperatures ranging preferably from about 10° C. to about 30° C.

TABLE VII

| Micronutrient | Source of Micronutrient | Proportions in Powdered Mixture (on an elemental basis) Relative to Iron |
|---|---|---|
| Copper | CuSO$_4$ | 0.1 |
| Manganese | MnCl$_2$ | 0.5 |
| | MnSO$_4$ | 0.5 |
| Zinc | ZnCl$_2$ | 0.5 |
| | ZnSO$_4$ | 0.5 |
| | Zn(NO$_3$)$_2$ | 0.5 |
| Iron | FeSO$_4$ | 1 |
| | Fe(SO$_4$)$_3$ | 1 |

INVENTION PARAMETERS

After sifting and winnowing through the data herein presented, as well as other results and operations of our new, novel, and improved technique, including methods and means for the effecting thereof, the operating variables, including the acceptable and preferred conditions for carrying out our invention are summarized below:

| Variables | Operating Limits | Preferred Limits | Most Preferred Limits |
|---|---|---|---|
| Polymer[1] | 1.0–5.0% | 3.0–5.0% | 4.5% |
| FeSO$_4$ or Fe$_2$(SO$_4$)$_3$ | 0.1–0.5% Fe | 0.1–0.3% Fe | 0.12% Fe |
| CuSO$_4$ | 0.01–0.1% Cu | 0.01–0.05% Cu | 0.01% Cu |
| MnCl$_2$ | 0.05–0.3% Mn | 0.05–0.2% Mn | 0.06% Mn |
| MnSO$_4$ | 0.05–0.3% Mn | 0.05–0.2% Mn | 0.06% Mn |
| ZnCl$_2$ | 0.05–0.3% Zn | 0.05–0.2% Zn | 0.06% Zn |
| ZnSO$_4$ | 0.05–0.3% Zn | 0.05–0.2% Zn | 0.06% Zn |

[1] Crosslinked polyacrylamide, preferably about 1 to about 10% crosslinking, more preferably from about 1 to about 5% crosslinking, and most preferably from about 1 to about 3% crosslinking (above about 10% crosslinking could result in a plastic or solid material).

While we have shown and described particular embodiments of our invention, modifications and variations thereof will occur to those skilled in the art. We wish it to be understood therefore that the appended claims are intended to cover such modifications and variations which are within the true scope and spirit of our invention.

What we claim as new and desire to secure by Letters of Patent of the United States is:

1. A composition of matter consisting essentially of a micronutrient containing hydrogel, said hydrogel containing from about 94.5 percent to about 98.9 percent water, from about 1 percent to about 5 percent by weight of a crosslinked polyacrylamide, and as the micronutrient constituent thereof from about 0.1 percent to about 0.5 percent by weight of ferric sulfate or ferrous sulfate or both such that juxtapositioning such hydrogel with plant growth media provides effective isolation of said micronutrient constituent therefrom to thereby ensure that said micronutrient constituent remains substantially water soluble for a period of time of at least about 14 days.

2. The composition of claim 1, wherein the water content of said hydrogel ranges from about 94.7 percent to about 96.9 percent, the polyacrylamide content ranges from about 3 percent to about 5 percent by weight, and the ferric sulfate or ferrous sulfate or both ranges from about 0.1 percent to about 0.3 percent by weight, and further wherein said period of time, during which said micronutrient constituent remains substantially water soluble, ranges from about 14 days to about 1 year.

3. The composition of claim 1, wherein the water content of said hydrogel ranges is about 95.4 percent, the polyacrylamide content ranges is about 4.5 percent by weight, and the ferric sulfate or ferrous sulfate or both is about 0.12 percent by weight, and further wherein said period of time, during which said micronutrient constituent remains substantially water-soluble, ranges from about 14 days to about 90 days.

4. The composition of claim 3, wherein said period of time ranges from about 14 days to about 45 days.

5. The composition of claim 1, wherein the degree of crosslinking of said polyacrylamide ranges from about 1 percent to about 10 percent.

6. The composition of claim 5, wherein said crosslinking ranges from about 1 percent to about 5 percent.

7. The composition of claim 6, wherein said crosslinking ranges from about 1 percent to about 3 percent.

8. The composition of claim 1, wherein from about 10 percent to about 60 percent of said polyacrylamide is substituted with polyacrylate.

9. A method of inhibiting the degradation of a water-soluble iron source micronutrients when applied to a situs comprising plant growth media by providing effective isolation thereof, said water-soluble iron source micronutrient selected from the group consisting of ferric sulfate, ferrous sulfate and mixtures thereof, which method consists essentially of the steps of:
  (a) introducing into mixing means, for intimately mixing solids or liquids or both, an amount of iron sulfate and an amount of water to effect a solution thereof containing from between about 0.1 percent to about 0.5 percent iron;
  (b) adding to said mixing means amounts of a crosslinked polyacrylamide polymer sufficient to provide therein from about 1.0 percent to about 5 percent by weight of said polyacrylamide and, after sufficient continued intimate mixing of the material in said mixer means, to provide therein a phase change from a fluid to a gel material and thereafter removing from said mixer means the resulting iron source containing hydrogel; and
  (c) subsequently applying at least a portion of said hydrogel to a situs comprising plant growth media whereby is provided effective isolation of said water-soluble iron source micronutrient from the deleterious effects of reaction with said plant growth media.

10. The method of claim 9, wherein the water content of said hydrogel ranges from about 94.7 percent to about 96.9 percent, the polyacrylamide content ranges from about 3 percent to about 5 percent by weight, and the ferric sulfate or ferrous sulfate or both ranges from about 0.1 percent to about 0.3 percent by weight, and further wherein said period of time, during which said micronutrient constituent remains substantially water-soluble, is at least about 14 days.

11. The method of claim 10, wherein the water content of said hydrogel ranges is about 95.4 percent, the polyacrylamide content ranges is about 4.5 percent by weight, and the ferric sulfate or ferrous sulfate or both is about 0.12 percent by weight, and further wherein said period of time, during which said micronutrient constituent remains substantially water soluble, ranges from about 14 days to about 1 year.

12. The method of claim 10, wherein said period of time ranges from about 14 days to about 90 days.

13. The method of claim 9, wherein the degree of crosslinking of said polyacrylamide ranges from about 1 percent to about 10 percent.

14. The method of claim 13, wherein said crosslinking ranges from about 1 percent to about 5 percent.

15. The method of claim 14, wherein said crosslinking ranges from about 1 percent to about 3 percent.

16. The method of claim 9, wherein from about 10 percent to about 60 percent of said polyacrylamide is substituted with polyacrylate.

17. A method for forming within plant growth media, enhanced root growth regions defining substantial discontinuities therein, wherein is provided an environment which is both mechanically and nutritionally enhanced for plant root growth and development, said enhanced root growth and development attributable, at least in part, to the lack of physical impediments and the higher than ambient concentration of available water and micronutrient therein, respectively, which method consists essentially of:
  (a) preparing an aqueous solution of micronutrients including iron, copper, manganese, or zinc from sulfate salts thereof, or manganese or zinc from chloride salts thereof, or zinc from nitrate, of from mixtures thereof;
  (b) utilizing at least a portion of the solution resulting in step (a), supra, to hydrate amounts of crosslinked polyacrylamides to form thereby micronutrient source hydrogels containing from about 1 percent to about 5 percent by weight of said polyacrylamides; and
  (c) subsequently applying at least a portion of said hydrogel resulting in step (b), supra, to said plant growth media in a manner mechanically sufficient to replace portions of said plant growth media with portions of said hydrogel and to thereby form said discontinuities.

18. The method of claim 17, wherein the amounts of said sulfates and/or said chlorides are predetermined to provide in the resulting hydrogel, the manganese constituent or the zinc constituent or both in amounts ranging from about 0.5 percent to about 0.3 percent by weight, the copper constituent in the range from about 0.01 percent to about 0.1 percent by weight, and/or the iron constituent in the amounts ranging from about 0.1 percent to about 0.5 percent by weight.

19. The method of claim 18, wherein said discontinuities in said plant growth media are underneath the surface thereof or juxtaposed the surface thereof or both.

20. The process of claim 18, wherein said discontinuities are in the root zone of said plant growth media.

* * * * *